United States Patent [19]  [11] Patent Number: 5,076,851
Škovára et al.  [45] Date of Patent: Dec. 31, 1991

[54] MIXED GYPSUMLESS PORTLAND CEMENT

[75] Inventors: František Škovára, Prague; Pius Ďurovec, Prachovice; Bohumil Černovský, Městec; Tomáš Všetečka, Prague; Jaroslav Hrazdíra, Brandýsek; Zdeněk Kadlec, Ždárec u Seče, all of Czechoslovakia

[73] Assignee: Ceskoslovenska Akademie VED, Prague, Czechoslovakia

[21] Appl. No.: 522,163

[22] Filed: May 11, 1990

[30] Foreign Application Priority Data

May 11, 1989 [CS] Czechoslovakia ............... 2826-89

[51] Int. Cl.$^5$ ........................... C04B 7/02; C04B 7/14
[52] U.S. Cl. ........................... 106/713; 106/714; 106/727; 106/736; 106/738
[58] Field of Search .............. 106/713, 714, 727, 728, 106/725, 724, 736, 738

[56] References Cited

U.S. PATENT DOCUMENTS

| | | | |
|---|---|---|---|
| 3,689,294 | 9/1972 | Braunamer | 106/727 |
| 3,959,004 | 5/1976 | Stryker | 106/725 |
| 3,960,582 | 6/1976 | Ball et al. | 106/725 |
| 4,032,353 | 6/1977 | Ball et al. | 106/725 |
| 4,066,469 | 1/1978 | Shiel et al. | 106/725 |
| 4,069,063 | 1/1978 | Ball | 106/713 |
| 4,168,985 | 9/1979 | Kolar et al. | 106/717 |
| 4,204,877 | 5/1980 | Moores et al. | 106/724 |
| 4,318,744 | 3/1982 | Dodson | 106/714 |
| 4,337,094 | 6/1982 | Tokar | 106/727 |
| 4,405,372 | 7/1983 | Serafin et al. | 106/727 |
| 4,472,201 | 9/1984 | Ochi et al. | 106/714 |
| 4,551,176 | 11/1985 | Skavara et al. | 106/757 |

FOREIGN PATENT DOCUMENTS

| | | | |
|---|---|---|---|
| 921057 | 2/1973 | Canada | 106/727 |
| 668908 | 6/1979 | U.S.S.R. | |
| 833692 | 5/1981 | U.S.S.R. | |
| 916463 | 3/1982 | U.S.S.R. | |
| 990714 | 1/1983 | U.S.S.R. | |

OTHER PUBLICATIONS

Tenoutasse et al., "Action of Triethanolamine on the Hydration of Portland Cement" (1973) *Silicates Ind.* 38(11) 233–8 Chem. Abstract.
Dusmuradou et al., "Effect of Triethanolamine on the Properties of Cement of Different Composition" *Uzb. Khim Zh.* 18(5) 55–7 (1974) Russian, Chemical Abstracts.
Hrazdira et al., "The Effect of Grinding Aids on the Properties of Gypsum Free Cements" *Ceramics Silikaty* 34(4) 307–14 (1990) Chem. Abstract.
Teorearu et al., "The Influence of Same Grinding Additives on Portland Cement Setting" *Mater. Constr.* (Bucharest) 17(3) 160–3, (1987) Chem. Abstract.
Henning et al., "Effect of Surface Active Additives in the Beginning Phase of Portland Cement Hydration" *Baustoffindustrie Ausg. B* (19) 36–8 (1976).

*Primary Examiner*—William R. Dixon, Jr.
*Assistant Examiner*—Paul Marcantoni
*Attorney, Agent, or Firm*—Leydig, Voit & Mayer

[57] ABSTRACT

A mixed gypsumless Portland cement of high initial and long-lasting strengths which contains 60–96.7 weight percent gypsumless Portland cement clinker with the specific surface of 350–550 m$^2$/kg and 3–40 weight percent of ground latently hydraulic matter, such as granulated blast-furnace slag, light ash, and the like, which two components have been ground in the presence of 0.01–0.1 weight percent of a liquid milling admixture, advantageously with a synthetic surface active matter with wetting properties, and containing 0–20 weight percent of fine amorphous SiO$_2$ and/or 0.1–3 weight percent sulphonated polyelectrolyte or ligninsulphonate and 0.5–6 weight percent alkaline carbonate, hydrogen carbonate, or alkaline hydroxide.

12 Claims, No Drawings

MIXED GYPSUMLESS PORTLAND CEMENT

The invention applies to a mixed cement based on cementation clinker mixed with latently hydraulic admixtures.

It is known in the production of cement to replace a part of the clinker in the cement by latently hydraulic matters. These matters include granulated blast-furnace slag, pozzolana, and, more frequently, light ash. Actually, mixed cements participate in the production of cements—in the world-wide measure—quite considerably. More than 90 million tons of matters with latently hydraulic admixtures share in the overall production of more than 280 million tons of mixed cements, and the use of slags and ashes leads to the production of more than million tons of cements. (R. Bucchi, "Outlines on additions and composite cements of view of industry", Proc. 8 Inter. Congress of Cement, Rio de Janeiro 1986, Vol. I, pp. 185-195.)

A way is also known to enable the better exploitation of the hydraulic properties of ground slags via slag-alkaline cements and concretes. V. D. Gluchovskij has paid considerable attention to these problems. (See V.D. Gluchovskij, Ščoločhonyje i Ščoločnozemelnyje gidravličeskije vjažuščije i betony. Kiev 1979, 1982.) In these works, there has been proposed the use of alkaline compounds, namely silicates and hydroxides, in considerably higher concentrations compared to that applied up to now, e.g., from 5 to 10 weight percent of the ground slag.

In USSR Patent 1,046,222 there is mentioned the composition of the binding agent containing more than 60 weight percent of slag ground at least to the specific surface of 300 m$^2$/kg, from 7.5 to 9 weight percent of the 20% solution of KOH, and from 22 to 27 weight percent of a solution of soda silicate.

From the Czech author's certificate 224,163, it is known that the binding agent based on hydraulically active gypsumless substance containing from 0 to 40 weight percent of ground cementation clinker with the specific surface of from 250 to 700 m$^2$/kg, from 100 to 40 weight percent of ground latently hydraulic matter, for example, slag, fly ash, and pozzolana, with the specific surface of from 300 to 600 m$^2$/kg, from 0 to 20 weight percent of very fine SiO$_2$ and/or containing milling admixtures, such as ligninsulphonates, and further containing batch water, synergistically acting mixture of substances containing from 0.2 to 3 weight percent sulphonated or sulphonmethylated condensate of monovalent or multivalent phenols with formaldehyde doped eventually with ferric, aluminum, or chromium cations, and from 0.5 to 10 weight percent of alkaline metal salt or alkaline earth metal, where the weight percent of matters is related to the overall weight of the powder binding agent.

From the technical literature it is also known to add to Portland cement slag ground to the specific surface of more than 500 m$^2$/kg (K. Sato, E. Konishi, and K. Fukaya, "Properties of very fine blast furnace slag prepared by classification", Proc. 8 Inter. Congress of Cement, Rio de Janeiro 1986, Vol. 4, p. 239).

The disadvantage of mixed cements is the slow growth of the initial strength. The hydration process is accelerated with the help of some known methods, especially through the addition of accelerating substances, for example, gypsum, calcium hydroxide, and other alkaline salts. The hydration process can also be accelerated in grinding the slag to a higher specific surface. In contradistinction to the cementation clinker, slags ground beyond the specific surface of 500 m$^2$/kg have no practical manifestation.

The mentioned disadvantage has been removed by the mixed gypsumless Portland cement according to the present invention. The substance of the cement contains from 60 to 96.7 weight percent of gypsumless Portland cement clinker with the specific surface of from 350 to 550 m$^2$/kg, from 3 to 40 weight percent of a ground latently hydraulic matter, for example, the granulated ground slag, fly ash, and the like. Both these components are ground in the presence of from 0.01 to 0.1 weight percent of a liquid milling admixture, advantageously with a synthetic surface active substance with wetting properties. The cement further contains from 0 to 20 weight percent of finely amorphous SiO$_2$ and/or from 0.1 to 3 weight percent of sulphonated polyelectrolyte, for example, sulphonated polyphenolate or ligninsulphonate, and from 0.5 to 6 weight percent of alkaline carbonate or hydroxide.

Systematic experimental works have proved the possibility of obtaining binding agents, based on the mixed cement according to the invention, which achieve both high initial and long-lasting strengths. Advantageously, use is made of the liquid milling admixture, especially of that with wetting properties, in milling the mixed cement and/or its different components. High initial strength has been achieved due to the elimination of the gypsum replaced by the synergistically acting mixture of sulphonated polyelectrolyte, for example, sulphonated polyphenolate or ligninsulphonate, and alkaline salt, especially carbonate. The latently hydraulic substance has been ground to the specific surface which exceeds that of current mixed cements, i.e., to the specific surface in the range from 350 to 550 m$^2$/kg.

The invention is exemplified by the following examples which, however, do not limit it. All percentage data set forth in the examples and tables are weight percents. The weight percents are related to the weight of the clinker.

EXAMPLE 1

From the clinker of the cement works in Prachovice and the granulated blast-furnace slag from Třinec, mixed gypsumless cements were prepared and ground in the ball mill with the addition of 0.05% cement liquid milling admixture. This admixture was the commercial preparation ABESON TEA (sodium alkylarylsulphonate or triethanolamide of dodecyl-benzoyl-sulphonic atea). The mixed cements were prepared by grinding to the specific surface in the range from 420 to 470 m$^2$/kg in different ratios of the cement to the slag. From the different mixtures, mortars were prepared with the cement-water ratio of w=0.31 and with the ratio of cement:sand of continuous granulometry=1:3. As admixtures, the following were applied: soda and Kortan FN (sodium-ferric polyphenolate with the addition of triethanolamine) dissolved in batch water. Table 1 shows the cement compositions and achieved properties.

EXAMPLE 2

From the clinker of the cement works in Prachovice and the granulated blast-furnace slag, mixed cement was prepared with the specific surface of 530 m$^2$/kg. The composition of the cement was the following: clinker 80% and slag 20%, with 0.05% of the preparation ABESON TEA having been applied as the milling admixture. From this cement, pastes were prepared with the cement-water ratio w=0.24 of freely liquid consistency. Soda and Kortan FN were applied as admixtures in the amounts set forth in Table 2. Table 2 also shows the properties of these pastes.

EXAMPLE 3

The clinker from the cement works Prachovice was ground with granulated blast-furnace slag to give the mixed cement of the specific surface of 460 m$^2$/kg. The content of the slag in the cement amounted to 10%. In the homogenizer further admixtures were added to the cement, namely 0.2% of Kortan FN and 0.5% of soda.

This cement has been worked up as a cement with the plastic consistency of w=0.22. The initial setting of this cement began after 3 minutes. After 15 minutes from the preparation it reached the compression strength of 1.6 MPa, after one hour 2.5 MPa, after two hours 4 MPa, after four hours 8 MPa, and after 5 hours 12 MPa. The achieved strength after 24 hours equaled 35 MPa.

The cement for which both the clinker and the slag have been ground separately to the specific surface of 450 m$^2$/kg and mixed prior to further treatment has the same properties in practice.

EXAMPLE 4

The clinker from the cement works Prachovice was ground together with the blast-furnace slag to form the mixed cement with the specific surface of 440 m$^2$/kg with liquid milling admixture added. Of this mixed cement, paste was prepared with w=0.24 of freely liquid consistency and setting starting after 50 minutes. The applied admixtures were 0.4% of Kortan FN and 1% of soda. The compression strength of the paste was 3.5 MPa after two hours after the setting, 10 MPa after 4½ hours, 55 MPA after 24 hours, and 89 MPa after twenty-eight days.

From the same cement a mortar was prepared with w=0.31 of from plastic to soft consistency with the use of sand 0-6.3 mm from Halamky. The applied admixtures were 0.8% of Kortan PN and 1.9% of soda. The setting of this mortar started after 50 minutes.

TABLE 1

| Content Of Slag In Cements | Content of Admixtures | Density (kg/m$^3$) | Start Of Setting (min) | Compression Strength (MPa) After 24 hours | Compression Strength (MPa) After 3 days |
|---|---|---|---|---|---|
| 5% | Kortan 0.7% + Soda 1.9% | 2382 | 105 | 46.8 | 53.6 |
| 10% | Kortan 0.7% + Soda 2% | 2402 | 65 | 42.6 | 51.2 |
| 15% | Kortan 0.7% + Soda 2.1% | 2382 | 65 | 41.1 | 49.2 |
| 20% | Kortan 0.7% + Soda 2.2% | 2343 | 55 | 39.0 | 48.0 |
| 30% | Kortan 0.7% + Soda 2.4% | 2324 | 40 | 30.0 | 40.0 |
| 0% | Kortan 0.6% + Soda 1.6% | 2324 | 45 | 42.0 | 45.1 |

Comparison Experiment according to the Czech author's certificate 244,163

| 80% | Kortan 0.6% + Soda 4% | 2300 | 120 | 3.2 | 15.1 |

TABLE 2

| Admixtures (%) | | Compression Strength (MPa) After: | | | | | | |
|---|---|---|---|---|---|---|---|---|
| Soda | Kortan FN | 2 hrs. | 3 hrs. | 5 hrs. | 6 hrs. | 24 hrs. | 7 days | 28 days |
| 1 | 0.4 | 4.4 | 6.3 | 9.4 | — | 65.5 | 75.0 | 98.0 |
| 1 | 0.5 | 3.5 | 4.8 | 7.0 | 16.5 | 58.5 | 72.0 | 90.6 |
| 1 | 0.6 | 2.5 | 3.5 | 5.6 | 7.1 | 60.0 | 83.5 | 102.4 |
| 1.2 | 0.4 | 4.0 | 5.3 | 7.5 | — | 58.0 | 76.0 | 97.6 |
| 1.2 | 0.5 | 3.6 | 5.3 | 7.5 | — | 59.0 | 74.0 | — |
| 1.2 | 0.6 | 3.3 | 3.9 | 5.8 | — | 59.5 | 80.5 | — |
| 1.4 | 0.4 | 4.3 | 6.5 | 11.3 | — | 66.0 | 87.5 | — |
| 1.4 | 0.5 | 3.5 | 6.3 | 8.6 | — | 54.0 | 71.5 | — |
| 1.4 | 0.6 | 2.3 | 3.6 | 6.3 | — | 61.5 | — | — |
| 1.6 | 0.4 | 4.5 | 7.5 | 12.0 | — | 60.5 | — | — |

It is claimed:

1. A mixed gypsumless Portland cement comprising 60-96.7 weight percent gypsumless Portland cement clinker with the specific surface are of 350-550 m$^2$/kg and 3-40 weight percent ground latently hydraulic matter selected from the group consisting of granulated blast furnace slag, fly ash, and combinations thereof, which components have been ground in the presence of 0.01-0.1 weight percent of a liquid milling admixture comprising a synthetic surface-active substance with wetting properties.

2. The mixed gypsumless Portland cement of claim 1, wherein said cement further comprises 0-20 weight percent amorphous SiO$_2$.

3. The mixed gypsumless Portland cement of claim 1, wherein said cement further comprises 0.1-3 weight percent sulphonated polyelectrolyte and 0.5-6 weight percent alkaline carbonate, hydrogen carbonate, or alkaline hydroxide.

4. The mixed gypsumless Portland cement of claim 3, wherein said sulphonated polyelectrolyte is a sulphonated polyphenolate or ligninsulphonate.

5. The mixed gypsumless Portland cement of claim 1, wherein said synthetic surface active matter is triethanolamide of dodecylbenzylsulphonic acid.

6. A mixed gypsumless Portland cement comprising 60-96.7 weight percent gypsumless Portland cement clinker with the specific surface area of 350-550 m$^2$/kg, 3-40 weight percent ground latently hydraulic matter selected from the group consisting of granulated blast furnace slag, fly ash, and combinations thereof, 0.01-0.1 weight percent liquid milling admixture comprising a synthetic surface active matter with wetting properties, 0.1-3 weight percent sulphonated electrolyte, and 0.5-6 weight percent alkaline carbonate, hydrogen carbonate, or alkaline hydroxide.

7. The mixed gypsumless Portland cement of claim 6, wherein said latently hydraulic matter is selected from the group consisting of granulated blast furnace slag, fly ash, and combinations thereof.

8. The mixed gypsumless Portland cement of claim 7 wherein said liquid milling admixture includes synthetic surface active matter with wetting properties.

9. The mixed gypsumless Portland cement of claim 8, wherein said sulphonated polyelectrolyte is selected from the group consisting of sulphonated polyphenolate, ligninsulphonate, and combinations thereof.

10. The mixed gypsumless Portland cement of claim 9, wherein said alkaline carbonate is sodium carbonate and said alkaline hydroxide is sodium hydroxide.

11. The mixed gypsumless Portland cement of claim 10, wherein said synthetic surface active matter is triethanolamide of dodecyl-benzoyl-sulphonic acid.

12. The mixed gypsumless Portland cement of claim 11, wherein said cement further comprises 0–20 weight percent amorphous $SiO_2$.

* * * * *